United States Patent [19]

Petriccione et al.

[11] Patent Number: 4,776,005

[45] Date of Patent: Oct. 4, 1988

[54] COMPUTER BASED INFORMATION SYSTEM FOR CHARACTER DISPLAY PHONE NETWORK

[75] Inventors: George A. Petriccione, Richardson; Daniel A. Seltzer, Dallas; Shelly A. Shandley, Lewisville, all of Tex.

[73] Assignee: Affiliated Telephone, Inc., Richardson, Tex.

[21] Appl. No.: 76,946

[22] Filed: Jul. 23, 1987

[51] Int. Cl.[4] .................... H04M 1/57; H04M 3/54
[52] U.S. Cl. .................... 379/142; 379/214; 379/96
[58] Field of Search ............. 379/142, 140, 112, 113, 379/130, 131, 133, 210, 214, 213, 94, 96

[56] References Cited

U.S. PATENT DOCUMENTS

| 3,506,791 | 4/1970 | Halaby . | |
|---|---|---|---|
| 4,121,052 | 8/1978 | Richard . | |
| 4,375,582 | 3/1983 | Gist et al. . | |
| 4,529,841 | 7/1985 | Andersson et al. | 379/213 |
| 4,582,956 | 4/1986 | Doughty . | |
| 4,640,989 | 2/1987 | Riner et al. | 379/96 |

OTHER PUBLICATIONS

Acquis Communications, Inc., "AXON-/4-V", ©1985 by Acquis Communications, Inc.
AT&T, "AT&T System 75: Digital Switching and Computer Control for Information Age Office Efficiency".
Northern Telecom, "Caller's Name Display Option Presents Personalized Information for Guest Services".
Northern Telecom, "Practice 553-2781-100".
Rohlm, "ETS 100 Telephone Features".
Rohlm, "Rohlm Electronic Message System".
"ITCM-75-602 of the Intelcom IBX System" (CH.2) Issue 1.

Primary Examiner—Jin F. Ng
Assistant Examiner—Wing Fu Chan
Attorney, Agent, or Firm—Stanley R. Moore; Thomas L. Crisman

[57] ABSTRACT

An interface circuit for a telephone instrument forming part of a character display phone PBX system. The circuit is connected to receive data signals indicative of the condition of the character display and keyboard portions of the instrument, and to store and manage the incoming data and produce a serial RS232 output for communication of the data to a computer or terminal device. The interface enables the use of a computing device to store large amounts of information related to potential calling parties and called parties which may be identified in the display of the telephone instrument and also to associate such information with messages entered into the computer via the keyboard. The overall system thus enables custom answering of a multiplicity of lines of such a character display phone system and use of a single multi-line phone as a messaging center.

11 Claims, 7 Drawing Sheets

COMPUTER BASED INFORMATION SYSTEM FOR CHARACTER DISPLAY PHONE NETWORK

BACKGROUND OF THE INVENTION

1. Field of the Invention

The invention relates to a personal computer based information system for a PBX having display phone capability and, more particularly, to an interface for an individual multiline character display phone instrument which manages and assembles call information sent to the character display phone by the PBX switch into RS232 format and transmits it to the PC.

2. History of the Prior Art

Today numerous manufacturers offer private branch exchange (PBX) telephone systems which include switching equipment and individual stations having the capability of displaying a plurality of characters of call information at each telephone instrument. Such system includes the capability of transmitting for each call sent to the station an encoded signal indicative of the multi-digit extension number of the calling party, followed by the extension number of the called party. Where applicable, the encoded signal also included the extension number of the first alternate extension to the called party number to which the call had been previously referred before being sent to the second alternate extension being rung. In the event the calling party is not another extension number within the PBX system, but rather an outside line, it can be identified on the display by a trunk number or some other identification indicative of the source of the call.

Call information on a character display phone enables the person who is answering several lines in an office, for example from an instrument having access to five different incoming lines, to answer the telephone in a "custom configured" fashion by knowing: (a) where the call is coming from (e.g., the President's office or the Phoenix WATS line); (b) which extension the call was originally intended for (e.g., Mr. Jones); and (c) that when Mr. Jones' line was busy or he did not answer after a predetermined number of rings the call had previously been forwarded to his secretary's extension, Ms. Smith, who is out ill that day. Thus, the individual answering the phone may say, "Mr. Jones' office, Ms. Smith his secretary is out sick today, this is Ms. Donovan, may I help you?". This mode of "custom configuring" the answering of the telephone by the answering operator gives a much more professional appearance to the office of the individual who's phone is being answered.

In addition, the person who is answering the line knows from the first set of digits on the character display phone that the call is coming from either an in-house station, the number of which may be recognized, or from a certain outside trunk. For example, individual trunks may be assigned to particular geographic regions or particular subsidiary companies and the answering party will know, for example, that the call is coming from the WATS line assigned to Phoenix callers, or from the number listed for a particular company name. This gives an additional professional appearance to the answering operator since it is known where the call is coming from or for which company the call is intended at the time the phone is answered.

One limitation of such display phone systems is the ability of the answering operator to memorize numbers. Since all the call information shown on the character display of the telephone instrument is numerical, only a limited quantity of extension and trunk numbers will be so frequently occurring that the answering party will have committed them to memory. A thorough familiarity with numerous trunk and extension numbers is essential to maximize the custom answering features enabled by the capability of the character display phone system.

For this reason, certain of these character display telephone systems also include memory and software within their own PBX switching equipment to be able to make the job of the answering operator easier by decoding the extension number within the switching equipment and simply showing on the character display of the telephone instrument the name of the calling and called parties, rather than the numbers. This is a great assistance when the answering operator has to deal with several lines and is unable to retain in memory all the information necessary to make maximum utilization of the telephone system. However, these systems are also limited to, usually, four letters for each trunk or extension number including each individual who's phone might be answered, which begins to tax an operator's memory as the number of possibilities increases.

Such character display phone systems operate quite efficiently as long as the answering operator only has to deal with a limited number of lines being terminated in and answered at the individual character display phone station. When a character display phone instrument is used as a message center where the answering operator may be answering calls for as many as a hundred or more different stations the problem becomes exceedingly complex. It is virtually impossible for the operator to "custom answer" so many lines by knowing the extension and code numbers of each of the potentially called stations or the potentially calling stations or trunks being connected successively, on a rotary basis one after the other, into any one of, for example, five lines terminated at that individual display instrument.

In addition, the message taking operation itself is also quite difficult when the answering operator is required to fill out a paper message slip for up to a hundred different stations for which she is answering calls. This requires a fairly complex system of collating and storing the messages and in order to be able to deliver them quickly to the party for whom the message is left upon their request.

To address custom answering and messaging for numerous lines many prior art telephone answering systems have incorporated computers to automate the handling of incoming calls for a plurality of different parties. For example, in U.S. Pat. No. 4,375,582 to Gist et al each incoming trunk is assigned to an individual line number and when that trunk is actuated, data is accessed within a computer memory and used to produce a display on the screen of a terminal indicating to the answering operator the name and certain information about the called party. These data are accessed remotely by conventional down line loading methods. The Gist et al system requires that an individual trunk be assigned and dedicated to each individual party for whom answering is to be done. This seriously limits the flexibility of the system and limits its use only to professional answering services, and, even there creates certain serious system limitations.

The system of the present invention overcomes these disadvantages by allowing a single telephone instrument having a limited number of incoming lines to be interfaced with a conventional personal computer or other terminal by means of an RS232 interface. As call information data comes from the switching system of the display phone PBX equipment, it is managed, reformatted, and passed on to the PC via the RS232 interface so that the PC can access stored information and produce a display showing names of calling, called and first alternate parties for guidance of the answering operator. The PC monitor display may also show other data associated with the calling or called numbers such as hours of operation, referral schedules and phone numbers for out of town parties, etc. In addition, the PC allows the answering operator to receive, organize and hold any messages for the called party which may result from the answered telephone transaction.

SUMMARY OF THE INVENTION

The system of the present invention includes an add-on board for a conventional character display telephone station which enables it to serve as a multi-line answering and messaging center by providing a PC interfaceable call information signal for each call as it is received at the station. This greatly facilitates the efficiency of the answering operators and enable the providing of "custom configured" answering of a hundred or more telephone stations and messaging for each call in an efficient, readily accessible fashion.

One aspect of the system of the present invention includes a computer and an interface for the call information signals from a PBX switching equipment directed toward an associated display phone. The interface organizes and manages a plurality of simultaneously occurring calls at a multi-line display station and produces a serial output of line and call identification data for a computer or other data terminal. The computer creates an operator display associated with the call data and generates within the computer a file associated with that call for storing a message for the called party.

In another aspect, the invention includes circuitry for receiving data for a multiplicity of lines answered at a single multi-line character display phone telephone instrument. The circuitry includes memory and processing circuits to manage the incoming data as well as produce a serial data output for interfacing with a PC terminal used in conjunction with the character display phone instrument as a multi-line answering and messaging center.

In still a further aspect of the invention, the system includes a display telephone instrument having the capability of decoding incoming data from a character display phone PBX switch and producing an RS232 serial data output for interfacing of those data with a PC terminal.

In still another aspect of the invention there is included a system for providing enhanced telephone answering and messaging for a PBX telephone system of the type including a plurality of incoming trunk lines and a plurality of PBX stations. Each of the stations includes a telephone instrument having an optical character display therein and means for transmitting call information signals from the switches of the PBX to the display telephone to generate a character display indicative of information about the call being sent to the telephone by the switch. At least one character display phone telephone instrument is connected as a station of the PBX, the instrument including keys for selecting one of a plurality of lines for connection to the instrument. Means are connected to the telephone instrument for receiving signals representative of the call information displayed by the character display on the instrument. Means are also connected to the telephone instrument for receiving signals produced by actuation of each key of the telephone instrument. A control means connected to the signal receiving means stores data representative of the signals and produces a serial data output stream indicative of a line number to which the instrument is connected and the call information associated with the call on that line. A personal computer has an input port connected to receive the output data stream from the control means for storing the line and call data in a memory. The computer has a means for storing in memory detail identification information associated with each item of data contained within the call information and means responsive to receipt of the data stream for recalling from the memory the detail identification and displaying the information for an operator answering the telephone instrument.

Additionally, the invention includes an interface circuit for a messaging station comprising a display telephone connected as a station of a PBX system capable of transmitting to and displaying at the telephone optical characters indicative of, for each call, the calling party and the called party. The telephone is capable of key accessing a plurality of different lines within the PBX, placing each of the lines on hold by actuating a hold key, and releasing the lines from hold by actuating a release key. The circuit comprises a central processing unit, a plurality of input buffers for connection to the display data signal connections within the telephone to couple the character information contained in the display to the CPU, and a plurality of input buffers connected to the keys of the telephone to couple to the CPU data signals indicative of actuation of any one of a plurality of line keys, the hold key or the release key of the telephone. The circuit includes a plurality of character memory locations, one location being associated with the storage of calling party and called party character information for each of the lines accessible by the telephone, a line number memory location for storage of data indicative of the line number currently connected to the telephone, and a line on hold flag memory, having a plurality of storage locations, one location for each of the lines to which the telephone is connectable, for storing an indication as to whether or not the line is on hold or not on hold. The circuit also includes means responsive to the detection of data from the buffers connected to the display of the telephone and to data from the buffers connected to the keys of the telephone for storing the data in memory associated with the line to which the telephone is connected and for assembling the data in a serial format representing line number, calling party and called party. The circuit transmits the serially formatted data from the interface circuit for communication with a computer or terminal device.

In a further aspect, the invention includes a method for facilitating the handling of call information at a messaging station comprising a character display phone connected to a display phone PBX capable of transmitting call identifying information to the station including calling party, and called party. The method comprises extracting character information indicative of the characters in the display of the character display phone and extracting keyboard information from the character display phone indicative of the actuation of any one of a plurality of the line keys, hold key or release key. The method includes storing data indicative of the character information in the display in a memory, storing the line number to which the phone is connected in a memory, assembling the stored character data and line number data in a serial format, and transmitting the assembled data in an RS232 format output for communication with a computer or terminal device. The method includes using the data for recalling from the computer recalling the computer memory data indicative of the call information and displaying for an answering operator of the character display phone information indicative of each call as it comes into the phone to enable custom answering of a plurality of separate lines.

BRIEF DESCRIPTION OF THE DRAWING

For an understanding of the present invention and for objects and advantages thereof, reference can now be had to the following description taken in conjunction with the accompanying drawing in which.

DETAILED DESCRIPTION

Character Display Phone

Figure 1:
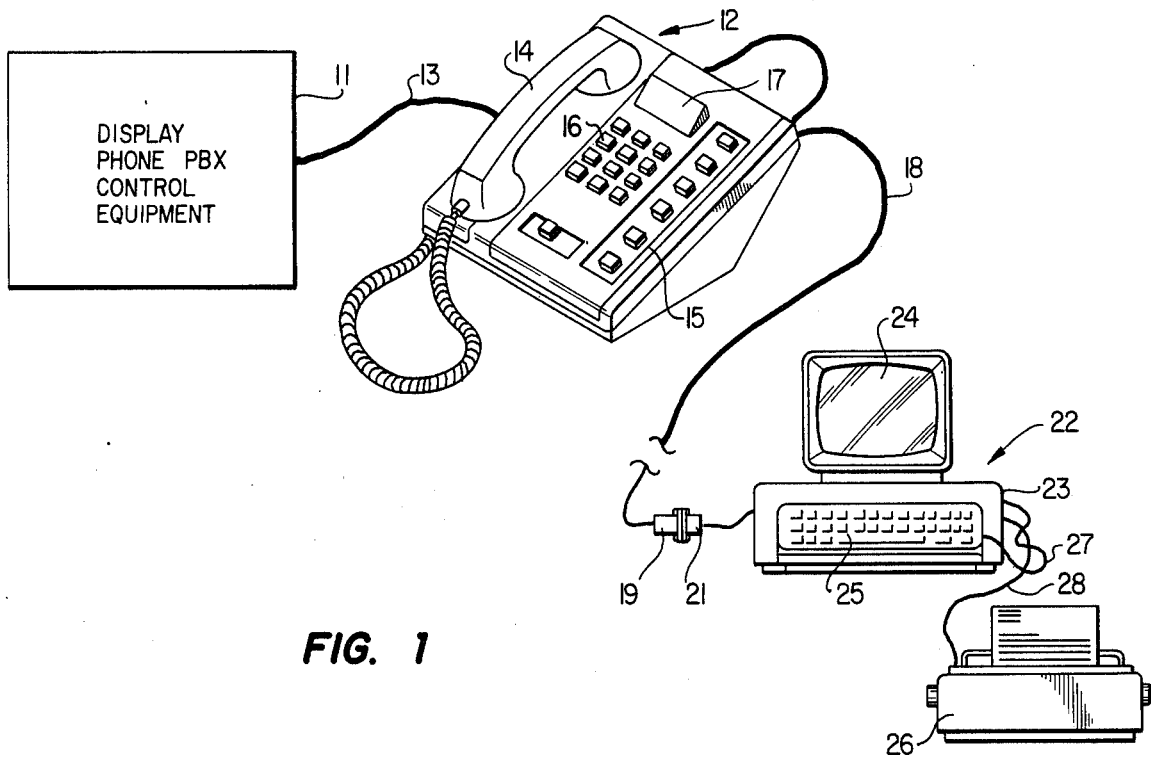
FIG 1 is an illustrative drawing of a character display phone answering and messaging system configured in accordance with the teachings of the present invention.

Referring to FIG. 1 there is shown an illustrative drawing of a system constructed in accordance with the teaching of the present invention. The system includes an array of control equipment 11 for a PBX system including character display phones as stations thereof. Switches within the control equipment 11 are connected to individual character display phone stations 12 by means of individual telephone lines 13. Each station 12 includes a handset 14, an array of keys 15 for selection of individual ones of a plurality of different lines terminated in the instrument, a dial pad 16 and an alphanumeric character display 17. The character display phone 12 has been modified in accordance with the teachings of the present invention to provide certain internal data in the form of an RS232 format output signal by means of a cable 18 terminated by a connector 19 interfaced with I/O port 21 of a conventional personal computer 22. The PC 22 includes a cabinet for the electronic circuitry 23 upon which is mounted a CRT monitor 24. A conventional computer key board 25 and an optional printer 26 are connected respectively by conventional cabling 27 and 28.

PBX systems having multi-character display telephones as stations thereof are offered numerous manufacturers. For example, Northern Telcom, Inc. manufactures a system sold under the trade designation of SL-1 which includes the character display phone and Rolm Telecommunications, Inc. manufactures a digit display system sold under the trade name ETS 100. In each of these systems the control and switching circuitry is adapted to transmit to the telephone station for each call an initial signal encoded with call information. The call information may include, for example, a multi-digit number identifying the calling party station if the call originates within the PBX system or a trunk designation of the call is from outside the PBX. In addition, the call information signal typically includes a multi-digit number identifying the called station, followed by a designation of the first alternate station (first rollover) to the initially called station if the call is arriving at the instrument being signalled after having been diverted from a first alternate station. Thus, for each call the individual telephone instruments 12 in the system of the present invention produce a linear array of numeric characters in the LED digit display 17 which characters correspond to the call information sent from the PBX switch. The character display 17 conventionally handles 16 characters each in seven segment format for displaying up to 3 four digit extension or trunk numbers separated by spaces, hyphens or other interdigit characters. Most character display phone, character arrays utilize a conventional seven segment LED character unit for each character position and the array comprises a module with 16 display units including a driver with character common signals and character segment signals for the array.

Figure 2:
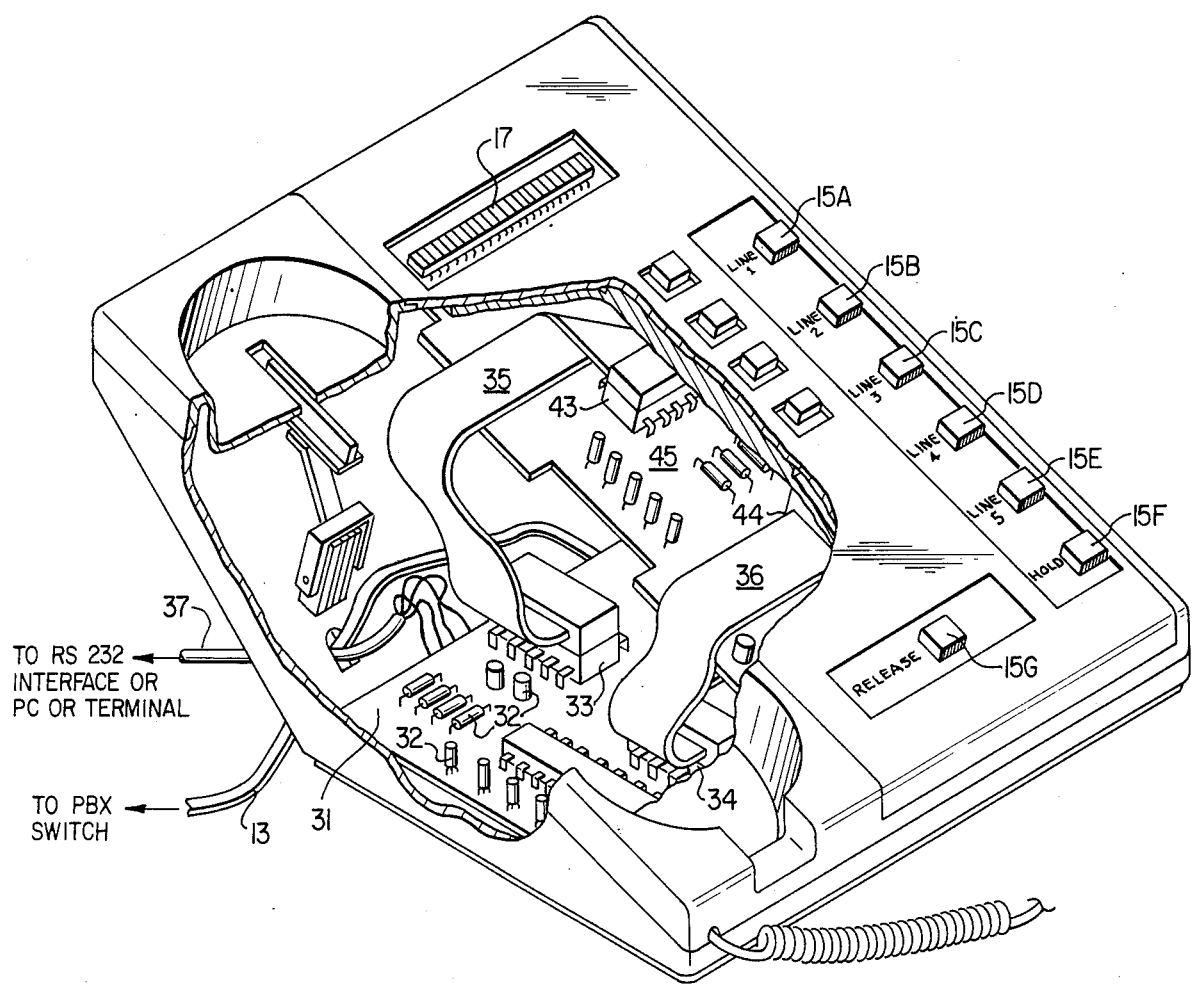
FIG. 2 is a partially cut-away illustrative drawing of a multi-line character display telephone instrument having been modified to include an add-on circuit board constructed in accordance with one aspect of the present invention.

FIG. 2 is a cut-away illustrative view of the character display phone instrument 12 of FIG. 1 having been modified to include an add-on board constructed and interconnected with the instrument in accordance with the teachings of the present invention. The character display phone 12 incorporates an LED display 17 having, for example, 16 character positions, line keys to select for example, five individual station lines 15A–15E, a line hold key 15F and a line release key 15G. The cable 13 extends from the character display phone 12 to the PBX switching equipment to which the telephone is connected.

Interface Board

As shown in the cut-away portion of FIG. 2, the add-on interface board 31 consists of a small printed circuit board having a plurality of electronic components 32 mounted thereon together with a display information connector 33 and a keyboard information connector 34. The character display phone 12 is modified to include a display data connector 43 and a keyboard data connector 44 wired to the printed circuit board 45 interconnecting the various electronic components of the phone 12. The connector 43 includes contacts which are connected to points on the board 45 which are in parallel with the data being displayed by the LEDs of the optical character display 17 while the connector 44 is connected to points on the board 45 which are in parallel with data signals within the telephone instrument 12 indicative of the actuation the keys 15A–15G on the instrument 12. A multi-conductor ribbon cable 35 interconnects the data on the connector 43 in the telephone instrument 12 to the terminals of the connector 33 on the add-on board 31 while a multi-conductor ribbon cable 36 connects the terminals in the telephone connector 44 with the terminals in the connector 34 of the add-on board 31. In this manner, signals indicative of the numerical contents of the character display 17 produced by the character display phone 12 in response to call information signals received form the PBX switch over the telephone line 13 is connected to the circuit of the add-on interface board 31. Similarly, signals produced by the character display phone 12 as a result of the actuation of any of the line keys 15A–15E, the hold key 15F or the release key 15G is also coupled into the circuitry of the add-on board 31. The interface board circuitry accepts the display and key information from the character display phone 12, manages and stores that information and assembles and transmits a serial data output stream on the line 37 in RS232 standard format to interface the data with the I/O input of a conventional personal computer or data terminal.

Figure 3A:
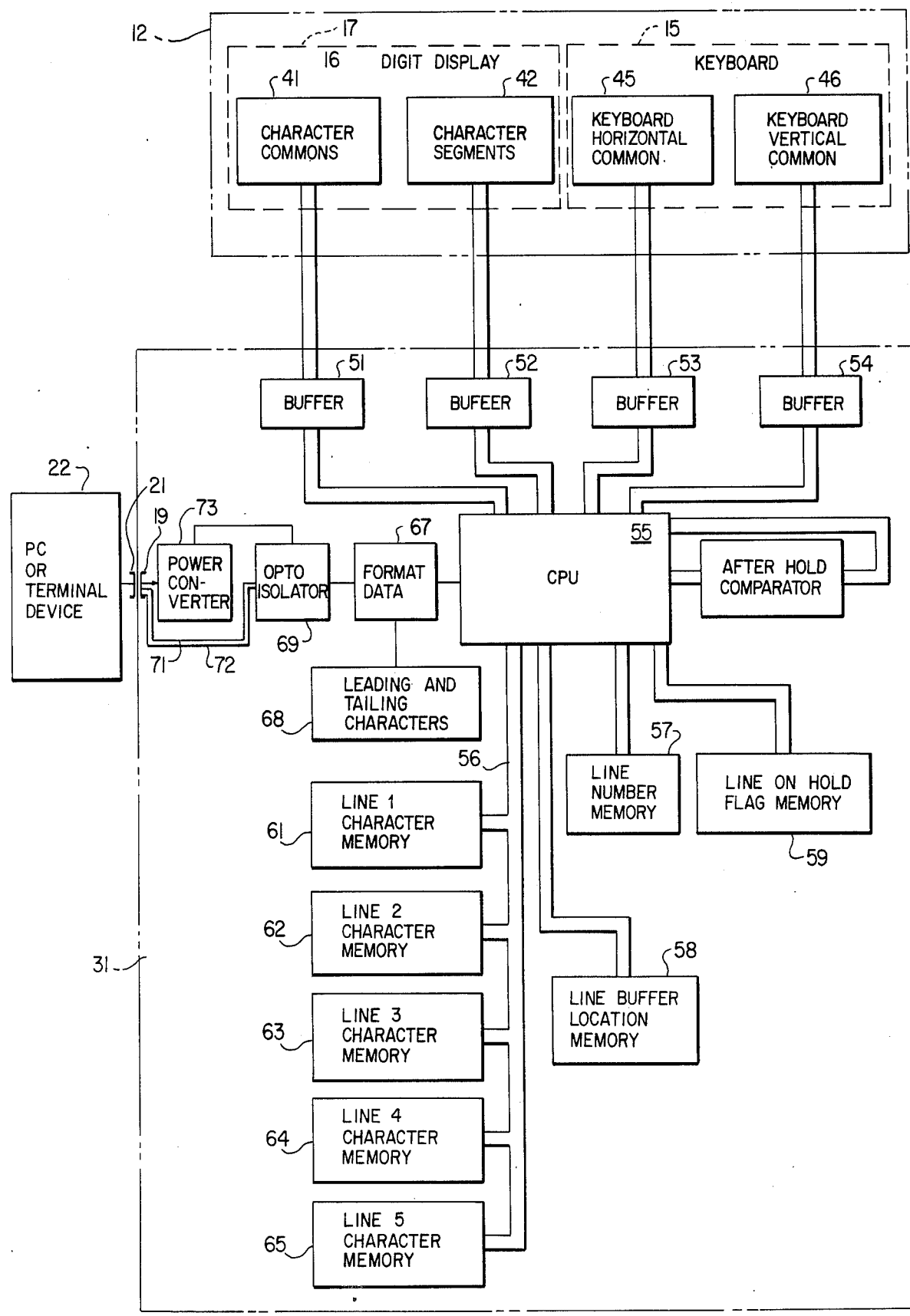
FIG. 3A is a block diagram of the circuitry of one aspect of the system of the present invention.

Referring next to FIG. 3A, there is shown a block diagram of the electronic circuitry on the add-on interface board 31 and its manner of interconnection with the character display telephone 12 and the PC terminal 22. In particular, the 16 digit display 17 includes a storage area for the character commons data 41, and a storage area for the character segments data 42. Similarly, the telephone keyboard 15 includes a set of keyboard horizontal common information 45 and a set of keyboard vertical common information 46 which, together characterize the state of actuation of each of the keys 15A–15G. The character common data from 41 is connected to a commons buffer 51 while the segment data is connected to a segments buffer 52. Similarly, the keyboard horizontal common data is connected into a horizontal buffer 53 while the keyboard vertical data is connected into a vertical buffer 54. The buffers 51, 52, 53, and 54 are connected by bus structure to a central processing unit 55. The CPU 55 is connected by means of a character memory bus 56 to a line 1 character memory 61, a line 2 character memory 62, a line 3 character memory 63, a line 4 character memory 64, and a line 5 character memory 65. Similarly, the CPU is connected by a bus structure to a line number memory 57, a line buffer location memory 58 and a line on hold flag memory 59. CPU 55 is also interconnected with an after hold comparator 66. The CPU 55 is connected to output data format and assembly registers 67 which are coupled to leading and trailing character data storage registers 68. The output of the assembly registers 67 are coupled through an opto-isolator 69 to form a standard RS232 format interface for conventional computing equipment. The RS232 output signals are coupled via lines 71 and 72 to output connector 19 which is connected to the conventional I/O input 21 of the PC or terminal device 22. Power for the output transistor in the opto-isolator 69 is supplied by means of a power convertor 73 which draws power from the terminal device itself regardless of the polarity thereof and supplies it to the opto-transistor within the opto-isolator as a negative voltage as is required therefor.

Figure 3B:
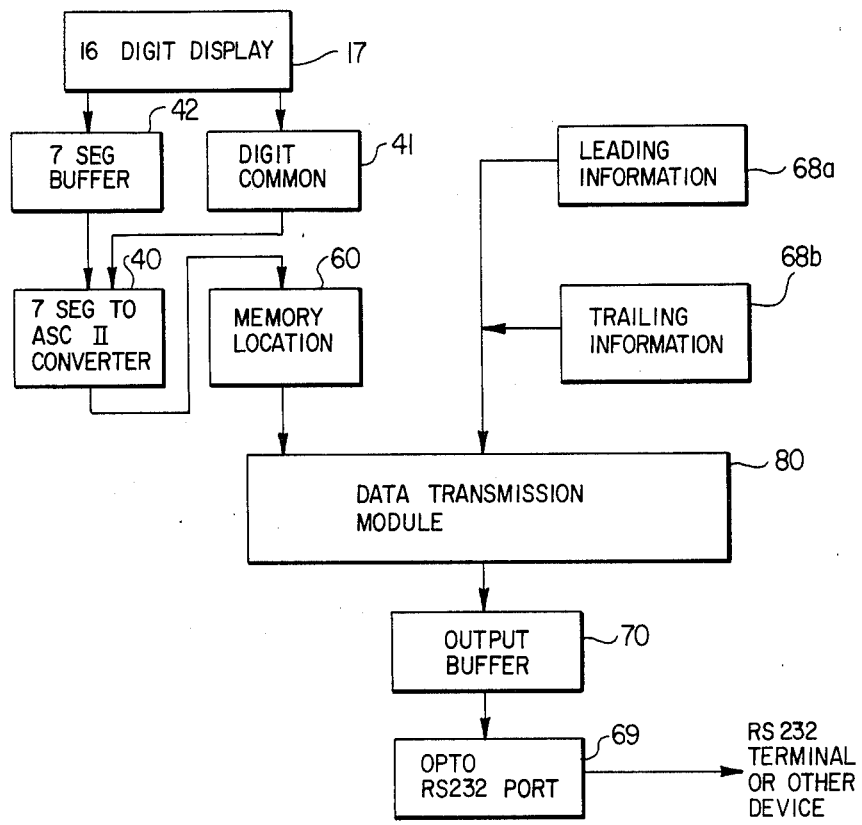
FIG. 3B is a functional block diagram illustrating automatic operation of part of the system.
Figure 3C:
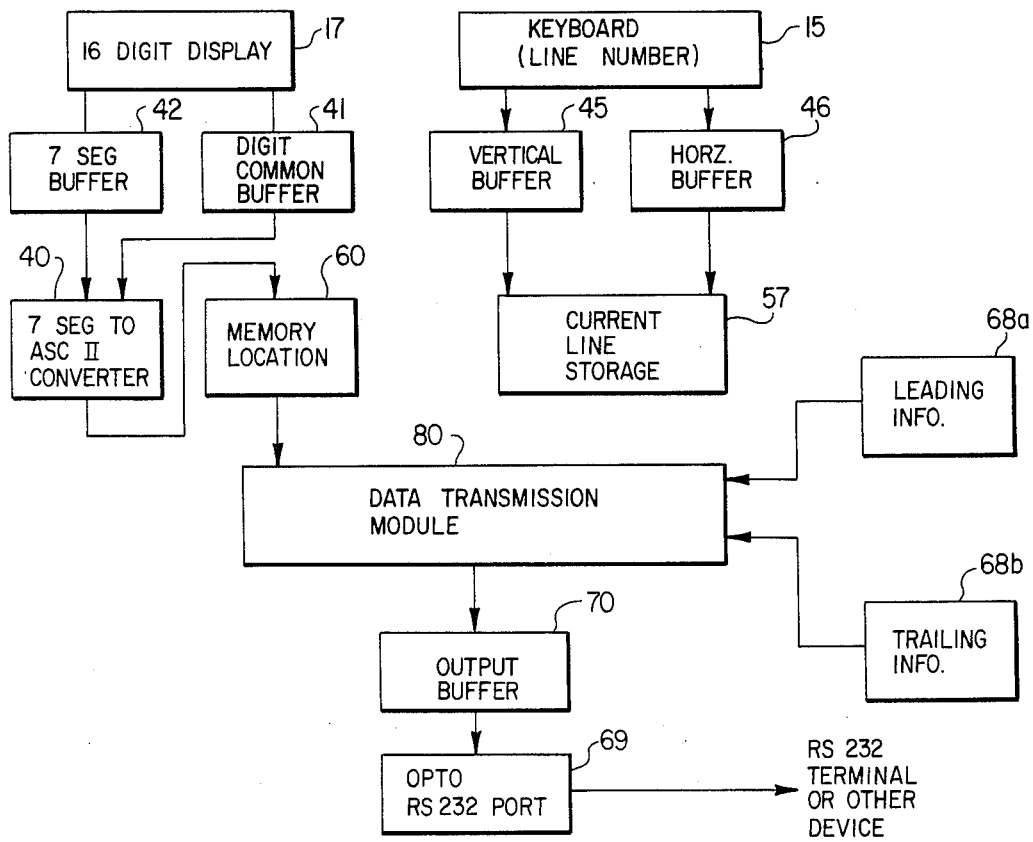
FIG. 3C is a functional block diagram illustrating manual operation of part of the system.
Figure 4:
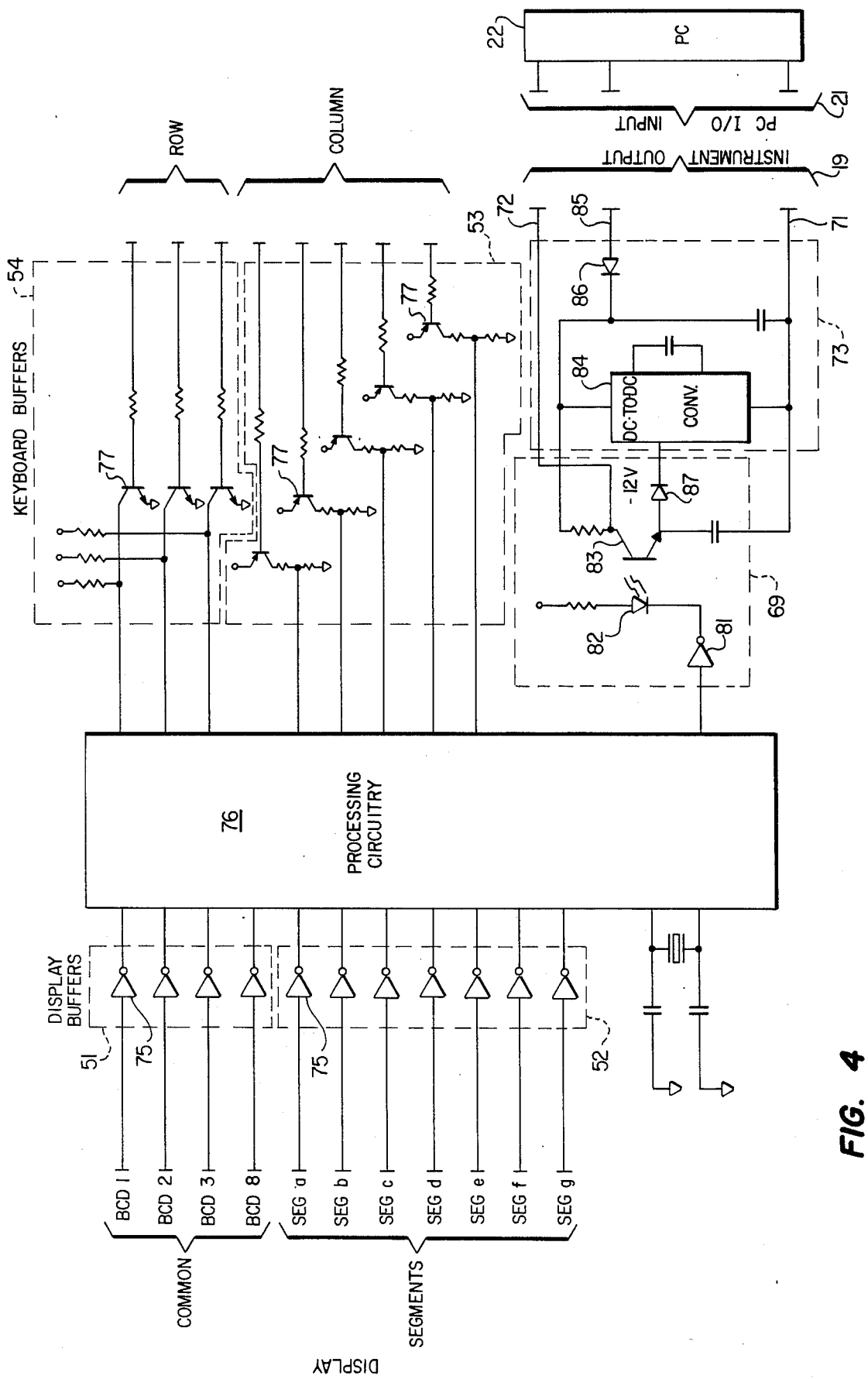
FIG. 4 is a schematic diagram of part of the circuitry employed in the system of the present invention.

Referring next to FIG. 4 there is shown a portion of the circuitry of FIG. 3 illustrating the manner of implementation of certain components thereof. In particular, the display buffers for the common display information 51 as well as the buffers for the segment display information 52 may comprise a plurality of inverting amplifiers 75, four for each of the leads BCD1–BCD8 and one for each of the seven segment leads of SEG(a)–SEG(g). The outputs of each of the inverting amplifiers 75 are coupled into the processing circuitry 76 which includes the internal memory and CPU along with its comparators, formatting registers and the other components necessary to receive, manage, format and transmit the data. Similarly, the processing circuitry 76 receives inputs from the keyboard buffers which may include three input transistor amplifiers 77 comprising the row keyboard buffers 54 and five transistor input amplifiers 77 comprising the column input buffers 53. Output from the processing circuitry 76 is by means of the opto-isolator 69 comprising an inverting amplifier 81 connected to a photo-diode 82 which is optically coupled to a phototransistor 83. The transistor 83 is connected to the RS232 signal leads in the form of line 71 for ground and line 72 for signal out to produce a serial output pulse wave form in a standard RS232 format for communications to an output port 19 of the device. The RS232 output from the modified display phone is connected to a conventional I/O input 21 of a PC or terminal device 32. The opto-isolator 69 is necessary because the the telephone system within which the add-on interface board 31 is incorporated may be either positive or negative ground in different cases. Such telephone systems may not be electrically interfaced directly with a PC device for risk of improper grounding which would result in defective operation of both the PC and the telephone equipment. Accordingly, the opto-isolator 69 is necessary to transmit information across that interface without a direct electrical connection. To maintain isolation, it is also required to obtain power for the opto-transistor 83 from a location other than within the add-on circuit board 31. For this reason, the present system includes a power convertor 73 which includes a DC to DC convertor 84 which takes power from one of the terminals in the PC I/0 port 21 coupled through the connector 19 into power lead 85 through a safety diode 86. The voltage has been passed through a DC to DC convertor which delivers a minus 12 volts to the emitter of the photo transistor 83 through the diode 87 to insure adequate power for its operation but which power is supplied regardless of the polarity of the PC device to which the RS232 input is connected.

System Operation

Referring back briefly to the overall system diagram shown in FIG. 1, an illustrative use of the system of the present invention will be described. First, it will be assumed by way of example, that the switch within the PBX control equipment 11 of the character display phone 12 transmits call information signals to the character display phone 12 indicative of a call originating from a trunk identified by the numeral 1 2 3 4 to a called station identified by the extension number 5 6 7 8 and which had been previously diverted to the first alternative for that extension identified by the characters 9 0 0 0 before it was direct to the phone 12 for answering. Thus, the display 17 of the phone 12 will show the characters: "1 2 3 4 5 6 7 8 9 0 0 0". The answering operator attending the station of character display phone 12 may then, if the call is coming in on line 1, press the key 15A associated with line 1 and answer the call. Also, as will be explained in greater detail below, one embodiment of the system for use in certain PBX's may include the feature of automatically defaulting the first call to the answering station to line 1 anyway and by simply lifting the receiver of the phone 12 the answering operator is connected with line 1 without having to press the line 1 key 15A.

Referring to FIGS. 1, 2, and 3A as soon as the call information is received at the phone 12 from the PBX 11, the call information data associated with the incoming call is connected from the display and keyboard data connectors 43 and 44 to the display and keyboard information connector 33 and 34 on the add-on board 31 which processes the data, stores portions of them within the system and generates a serial RS232 output signal over line 18 to computer 22. Receipt of the RS232 data identifying line number, calling party, called party, and first referred party causes the PC 22 to retrieve from memory detail data associated with each item of call information. The detail data is then displayed on the screen of the monitor 24 to show the answering operator, for example: (a) the calling party's name or the trunk identification name; (b) the called party's name and any additional associated data such as the fact that he is out of the office four days and his whereabouts for emergency contact; and (c) the name associated with the called party's first alternate extension and any associated data, e.g., "Ms. Smith, Mr. Jones' secretary, is out of the office ill this week." The information displayed on the PC monitor 24 in response to the RS232 signal from the digit display phone interface board 31 is all stored in the memory of the PC 22. The names and other data are stored in direct connection with associated PBX extension or trunk numbers so that the data can be simply and regularly updated to provide the most recent information to the answering operator and enable knowledgeable custom answering of a large number of lines.

When a call comes in to the digit display phone answering and messaging center 12 the present system enables the answering operator to glance at the information on the screen of the monitor 24 and answer the phone in a custom configured fashion having full benefit of all of the detail information on the screen. Should the calling party desire to leave a message for Mr. Jones or Ms. Smith the answering operator can immediately type the information via the keyboard 24 into the PC 22 and it will be stored away in direct association with the appropriate extension number for ready retrieval along with any other desired data associated with the call.

If, while the answering operator is in the process of taking the above-described exemplary call on line 1 an additional call comes in on another one of the other lines it may be necessary to place the first call on hold and answer the second call. Pressing the hold key 15F on the character display phone 12 sends a signal back to the PBX switch which places the call on hold at that point. This allows the switch to send to the phone 12 a call information signal associated with the next call in sequence to be answered. When the hold key 15F is actuated on the phone 12, it is detected by the interface board 31 which stores in its memory the call identifying data for the line being placed on hold along with an indication that line 1 is now on hold. When the call information signal associated with the new incoming call is sent from the PBX switch onto line 2, for example, of the character display phone 12, the call identifying characters enter the LED character display 17. From the display they are received, stored, assembled into RS232 serial format, and sent to the PC 22 by the add-on interface board 31. The PC 22 accesses its own memory for data associated with the extension and/or trunk numbers contained in the call identifying information received from the board 31 and causes it to appear on the screen of the monitor 24 for the answering operator. Thus, when the answering operator depresses key 15B to answer line 2 the answering may be done in a custom and expeditious fashion with full knowledge about the calling and called parties as was done with line 1.

Should, the answering operator, after answering line 2, desire to go back on to line 1 to finish the messaging for the calling party on line 1, the operator again activates the hold key 15F. This causes the call on line 2 to be placed on hold back at the PBX switch. Actuation of the hold key 15F is also detected by the interface board 31 which stores in its memory the call identifying data for the line being placed on hold along with an indication that line 2 is now on hold. To return to line 1 the operator actuates key 15A which sends a signal to the PBX switch to send the call information for the call it is holding on line 1 back to the display phone 12. The call identifying information enters the display 17 of the phone 12 and is received by the interface board 31. The interface board 31 then retrieves from its memory the stored call identifying information associated with the call which was previously on line 1 and compares it with the call identifying information presently on line 1 to insure that while line 1 was on hold, the party which was there did not hang up to be replaced by a new calling party, which if answered in accordance with the old data could result in embarassment to the operator. If the stored and newly received call identifying informations are identical then the call which is now on line 1 is the same call which was previously on line 1. The interface 31 then assembles a serial RS232 output signal from the stored line 1 call identifying data and sends it to the PC 22. The PC again accesses its memory and brings up on its monitor 24 the information associated with each segment of the call identification information signal for use by the answering operator. The operator enters the message via the keyboard 25 of the PC which stores it in memory for the appropriate party. Following the entry of the message into the computer the release key 15G is pressed to release line 1 and reenter on key 15B for line 2 to complete the message transaction on that line. Alternatively, one doesn't necessarily have to press the release key but can hang up the receiver, or simply press another line key.

If the interface board 31 found that the call identifying data stored in its memory in association with line 1 on hold was not the same as the call identifying data in the character display 17 when line 1 is taken off hold it means that the party on hold had hung up and been replaced by a new call. In which case the interface 31 discards the previously store call identifying data for line 1 and replaces it in its memory with the new call identifying data on line 1 and assembles and transmits to the PC on RS232 signal indicative of the new call identifying data.

Circuit Operation

Referring FIG. 3A, the above-discussed system operation for an operator answering sequence will again be traced to illustrate the manner in which the interface circuitry of the system operates to handle and manage the incoming call identifying and keyboard data and assemble and transmit a serial RS232 output signal to the PC of the system. When a call comes in to the character display phone 12 the call identifying information signal from the PBX switch is decoded by the telephone 12 and displayed in the 16 digit characters display 17 in response to the character information contained in the character commons data storage area 41 and the character segment data storage area 42. The CPU 55 recognizes that a call has been received by virtue of the information sensed in the characters common buffer 51 and the characters segment buffer 52. If there is no other call in progress within the telephone 12 when the first call comes in, it is automatically diverted to line 1. The system automatically "forces" the call to line 1 if there is no line on hold, or no other information being handled by the system at that moment.

When the CPU 55 recognizes that character data has come into the buffers 51 and 52, it also recognizes that a call is on line 1 from the data in keyboard buffers 53 and 54. The call is associated with line 1 because it is automatically forced to line 1, if it is the first call, or because the operator has actuated the line 1 key 15A. In either case, the CPU 55 consults the line on hold flag memory 59 to see whether or not a flag had been set within this memory indicating that line 1 had previously been on hold before this call come in. If it had not been on hold and no flag had been set in memory 59, the CPU 55 goes to the line buffer location memory 58 and determines the line buffer character memory location where it should store the call identifying data associated with the call which has come in on line 1. With the buffer location information from memory 58 it then sends the call identifying data via bus 56 and stores it in the line 1 character memory 61. It also stores an indication in line number memory 57 that it is processing a call on line 1. The CPU 55 thereafter assembles in the format data registers 67 the character identifying data for the call which has come in on line 1 with the line number first, followed by the calling number, next by the called number, and next by the first alternate (roll over) number. Leading and trailing edge information for the character data is added by the circuitry 68 and the assembled information in serial RS232 format is input to the opto-isolator 69 and out onto the lines 71 and 72 to the RS232 interface connector 19 from the interface board 31. The serial ASC II data is coupled to the I/O port 21 of the PC or terminal device 22 advising it that a call has been received on line 1 and furnishing it with the call identifying information. The PC 22 stores the line identifying information together with the call identifying information in its own memory and calls up from its memory detail information which has been previously stored in association with each of the calling number, called number and first roll over number. The PC assembles and displays the call identifying data on the display screen 24 of the PC 22 so that the answering operator knows substantially immediately all available information concerning the incoming call on line 1 before she actually answers it. The call information is now stored in the line 1 character memory location 61 of the interface 31, stored in the RAM memory of the PC 22 and detail information associated therewith is displayed on the CRT monitor 24 for the use by the answering operator.

As a next step in illustrating the operation of the circuitry of FIG. 3A, it will be assumed that while the call on line 1 is being handled by the answering operator, a second call comes in on line 2 which is signalled to the operator in a conventional fashion by ringing and flashing in the telephone 12. The operator now presses the hold key 15F on the keyboard 15 which produces signals in the keyboard horizontal common storage 45 and the keyboard vertical common storage 46 coupled through the buffers 53 and 54 to the CPU 55. The CPU 55 then recognizes that line 1 has gone on hold and goes to the line on hold flag memory 59 to set a flag in the location of that memory associated with line 1. The PBX switch recognizes the signal from the hold key 15F to place the line on hold. When the answering operator actuates key 15B to answer the call on line 2 the PBX switch sends the call identifying information signal to the phone 12 which decodes it and generates corresponding characters in the display 17. When the answering operator pressed the line 2 key 15B on the keyboard 15 there was produced corresponding signals in the keyboard unites 45 and 26 and coupled through the buffers 53 and 54 into the CPU 55. The CPU then sets the line number memory 57 to indicate that it is now attending to a call on line 2, checks the line on hold flag memory 59 to whether or not line 2 was previously on hold or not and, if not, goes to the line buffer location memory 58 to locate the area in which it should now store the call information associated with line 2. Next, the CPU 55 sends the call information over the bus 56 to the line 2 character memory 62 where it is stored. Thereafter, the CPU 55 formats the line and call data in registers 67 by assembling in serial fashion the identification of line 2, the calling party number, the called party number and the first-roll over number. The leading and trailing character information is added from 68 registers and the serial screen of data is output in RS232 format via the opto-isolator 69 and the leads 71 and 72 to the RS232 interface 19. The data are coupled through the I/O input 21 of the PC 22 to advise it that a call has now come in on line 2 followed immediately by the call identifying information for the call. The PC 22 stores the call identifying information in a location associated with line 2 and calls up from memory detailed information associated with the calling party, called party and first-roll over party information and then displays it on the CRT screen 24 of the PC 22 for communication to the answering operator. In this manner, calls continue to be received by the character display phone 12 and placed on hold up to the full complements of lines represented on the keys of the switch.

Assuming that line 1 was placed on hold, and the call on line 2 answered as just described, it is next desired to place line 2 on hold and go back to the call on line 1 to complete the taking of a message from that caller. When the hold key 15F is actuated to place line 2 on hold, a signal is sent to the PBX switch to place the call on hold at that point. The action of hold key 15F also generates a signal from the horizontal and vertical common storage areas 45 and 46 which is coupled through buffers 53 and 54 into the CPU 55. In response, a line 2 flag is set in the line on hold flag memory 59. When the line 1 key is pressed on the keyboard 15 the PBX switch transmits the call identifying signal for the call being held on that line 1 to the display phone which decodes it and generates characters in the character display 17. Line 1 key identifying information from the storage areas 45 and 46 is coupled through the buffers 53 and 54 to the CPU 55 which stores a line 1 indicater in line number memory 57. Upon checking the line on hold flag memory 59, the CPU 55 finds that line 1 had previously been on hold and a flag was set. If so, the CPU 55 retrieves the information previously stored in the line 1 character memory 61 sends it into the after hold comparator 66 where it is compared with the incoming information from the buffers 51 and 52 as to the call identifying information which now appears in the display 17 for line 1. If the data are the same, as evaluated by the comprator 66, it means that the call now on line 1 is the same call which was on line 1 when we originally placed it on hold. If that is the case those data are then formatted in registers 67 with trailing edge information from registers 68 and output in ASC II format through the optoisolator 69 to the PC 22. The PC brings up the stored detail call identifying information from memory for display on monitor 24 for the answering operator.

If, however, the CPU 55 found that the call identifying information previously stored in line 1 character memory 61 did not identically match the call identifying information coming in from the display 17 through the buffers 41 and 42 when compared in the comparator 66 it is an indication that the call now on line 1 is not the same call as was on line 1 when it was placed on hold. The interface 31 then discards the old line 1 call information and substitutes the new line 1 call identifying information into the line 1 character memory 61 by, first, finding the location in the line buffer location memory 58 and then storing away the new information. The new information is then assembled in RS232 format and sent to the PC 22 which then brings up afresh from memory information to the screen of the CRT 24 advising the answering operator of the data associated with the call now on line 1. Such a situation would happen primarily because while line 1 was on hold the original calling party had hung up and a new call had rung in on line 1. This feature allows the operator monitor information to be updated and prevent going back to line 1 assuming that it was the same call which had originally been placed on hold.

INTERFACE SOFTWARE

Functional Operation

From a functional standpoint the interface circuitry of the present invention may include a properly programmed microprocessor and other associated circuitry which may, additionally, operate in two modes, automatic and manual. Referring first to FIG. 3B, the exemplary operation in automatic mode where the first call is forced to line 1, will be described. A call comes in from the PBX switch onto line 1 of the character display phone 12. The call identifying information is displayed by the phone 12 in its 16 digit character display 17. The display information, is read by interface logic including a seven segment inverting logic buffer 42 and a digit common inverting logic buffer 41. The buffers 41 and 42 are connected to the processor I/O ports. The processor includes a seven segment to ASC II converter which converts each seven segment into a hexadecimal byte. Each byte is added to a memory location 60 which will store all 16 characters. The processor then adds leading information from 68A and trailing information from 68B to a data transmission module 80 which transmits the character string in ASC II, at about 1200 Baud, through an output buffer 70 to an RS232 port 69. Thus display call identifying information is connected to RS232 data and passed on to a PC terminal or other RS232 input device.

For manual operation, as functionally illustrated in FIG. 3C, a call comes in from the PBX switch on any one of lines 1 through 5 of the display phone 12. The call identifying information is displayed in the 16 digit character display 17. A line number key in the keyboard 15 is actuated to answer the call on that line and vertical buffers 45 and horizontal buffers 46 are read into the processor I/O ports and stored in current line storage memory 57. In addition, the display information is read by interface logic buffers 41 and 42 into the processor I/O ports. The processor connects each seven segment character into a hexadecimal byte at 40 and adds it to a memory location 60 which stores all 16 characters and the current line indication. The processor then adds leading information form 68A and trailing information from 68B to data transmission module 80 which transmits the line and character string in ASC II, at about 1200 Baud, through an output buffer 70 to an RS232 port 69.

Keyboard and Display Routines

Figure 5A:
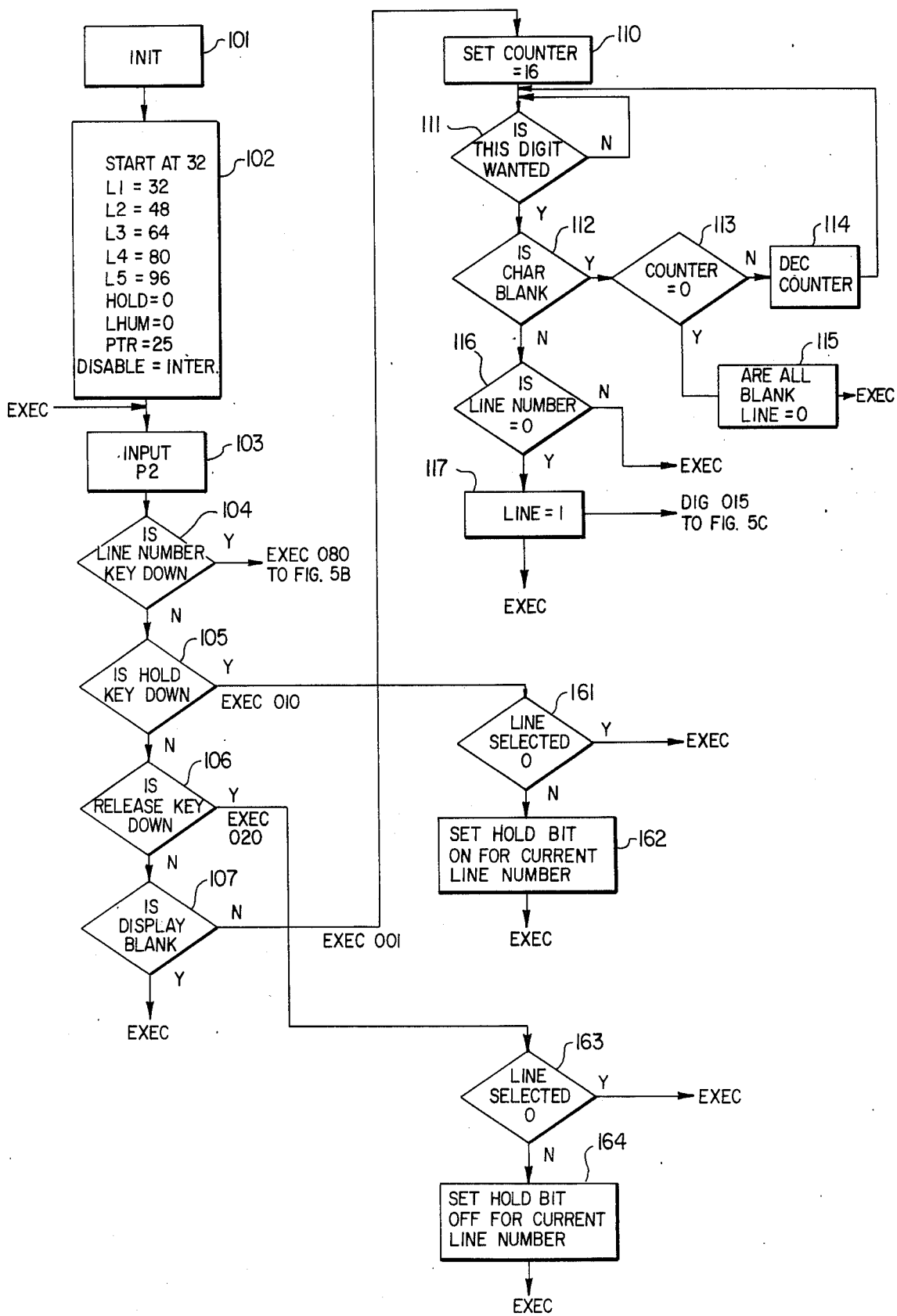
FIG. 5A is a flow diagram of the key monitor, hold and release key actuation and test for blank display routines used in the system of the present invention.
Figure 5B:
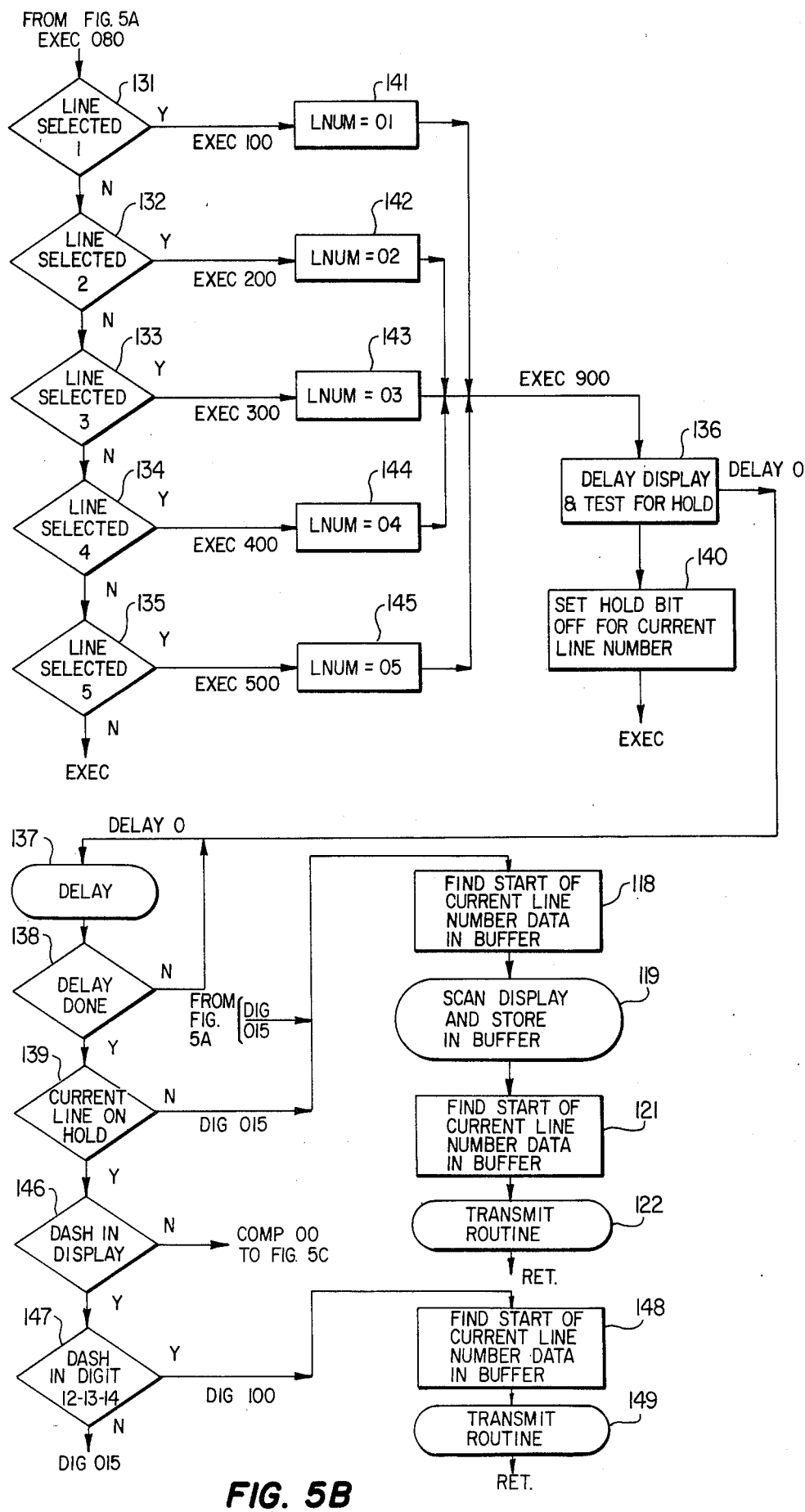
FIG. 5B is a flow diagram of the line number key actuation, fetch digits from display, read display delay, and transmit line and call information routines used by the system of the present invention.
Figures 5C, 6:
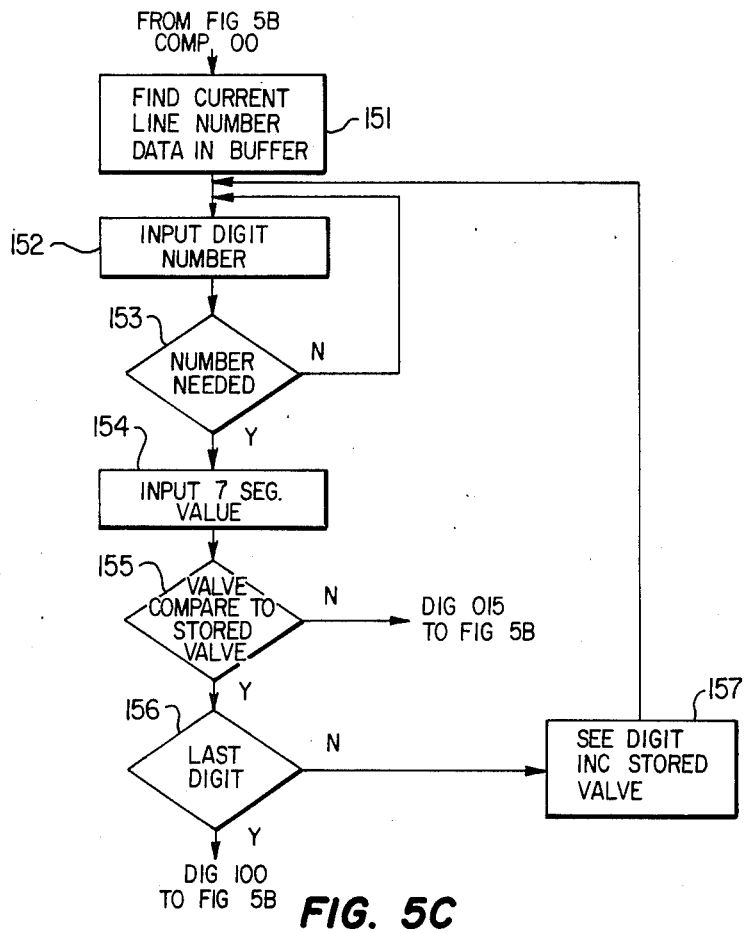
FIG. 5C is a flow diagram of the after hold comparison routine used by the system of the present invention.
FIG. 6 is an overall software block diagram of the system of the present invention.

To further explain the operation of the system of the present invention reference will now be had to the flow diagrams of FIGS. 5A-5C and the circuit of FIG. 3A which illustrate the program software routines controlling the interaction of the various functional components of the interface circuitry of the present invention. Referring first to FIG. 5A there is shown the key monitor, hold and release key actuation, and test for blank display routines. The key monitor routine, shown on the left hand side of FIG. 5A, is the basic input data triggering routine for the various functions of the circuitry. When the program is initiated at 101 it starts with an initialization step at 102 which first clears all of the hold flags in the line on hold flag memory 59, clears the line number memory 57, clears the character memories 61–65 and assigns line buffer locations for each of the line 1–line 5 character memories in the line buffer location memory 58. In addition, the initialization step 102 stores test data in each of the line character memories 61–65 in the form of a series of consecutive digits corresponding with the line number. For example, after initialization actuating the line 1 key 15A sends a series of 16 contiguous 1's via the RS232 interface to the PC. Similarly, actuating key 15B for line 2 sends a series of 16 consecutive 2's and so forth to test the operation of the circuitry and insure that all is ready and initialized after power up. These are essentially default messages and the information is stored in the character memory locations for test.

After initialization the program goes into the executive portion of the loop of this routine which begins at 103. At 103, the system begins the executive loop and looks at input port number P2 which is used to represent the keyboard information in the buffers 53–54 in the form of hexadecimal character datas. Beginning at input 103 the system first evaluates at 104 whether there is data present indicating that a line number key 15A–15E is down. If no, the system goes on to 105 where it evaluates whether there the hold key 15F is down. If not, the system proceeds to 106 where it evaluates whether the release key 15G is down and, if not, proceeds on to 107 where it evaluates whether from the output buffers 51 and 52 the display is blank. If the answer at 107 is yes the system proceeds back up to the top of the executive loop and into step 103 again to again look at the keyboard input port. The system continues to evaluate the status of the line key and display buffers in this fashion until either one of the keys is depressed or the display is no longer blank indicating that a function is in progress.

In the event the system found at 107 that the display was not blank the routine proceeds to executive loop 001 which is the test for blank display routine. At 110 the routine sets its counter equal to 16 in preparation for looking at a series of 16 separate characters beginning with the 16th one and moving backward toward the first one. The system is, of course, looking at a binary number in which form the character common data is produced. At step 111 the routine looks at the character coming in to the interface via the character buffers and asks whether the character coming in is the digit wanted, i.e., in the initial pass is it the 16th digit? If not, it continues to search until the desired digit is located. If yes, this is the digit wanted, the program passes to 112 where the actual value of the seven segment portion of the character to be evaluated is examined. In 112 the question is asked whether the character is blank or not. If yes, the program moves to 113 where the question is asked whether the counter value is equal to zero or not, i.e., have we decremented down from the 16th character position back through the first character position and finished the evaluation of all the characters or not. If not, the counter is decremented at 114 and again the question asked at 111 is this the digit wanted? If, however, the counter is found to be equal to zero at 113 the program determines at 115 that all the characters are blank and the line number is equal to zero. Thereafter, the routine returns to the executive loop at the top of 103 on FIG. 5A. If, however, the character was determined not to be blank at 112 then the program evaluates at 116 whether the line number is equal to zero. In step 111 the routine is simply looking at the character data from the buffers as it comes along and waiting to detect from the character common information whether the desired characters come along. That is, it waits until the desired character comes up and then determines whether or not it is a zero. The routine continues to repeat the loop of evaluating whether or not the character is zero (in order to test for blank display) until it gets down to the last character. There, if the last one is also blank then it is known that all the characters are blank and, thus, that the entire display is blank.

If it was found at location 112 that the character is not blank, then at 116 it is asked whether the contents of the line number 57 is zero. If not and there was something on the display, it means that the PBX line switch had simply been slow in removing the characters from the display and, in effect, a data error has occurred. This step detects the presence of that data error and simply returns us to that executive loop on FIG. 5A to go around again and see if any of the keys have been actuated. That is, if there's nothing on the display and the line number is not equal to zero it means that the operator has actuated a line key to answer a call and the process has looked too quickly and saw that the number hadn't come out yet. In this case, we simply go back to the executive loop on FIG. 5A and wait a little bit longer by scanning the key and display buffers looking for the number to come up.

If, however, the line number is equal to zero at 116, at step 117 we set the line number to equal to one and then execute a call to DIG015 subroutine shown in FIG. 5B. This is indicative that a call has come in and the system needs to fetch the digits from display for a new number in accordance with the routine shown in FIG. 5B. In this way the system forces the first call of an idle system to line 1 without the operation having to actuate the line 1 key 15A. The fetch digits routine for a forced line 1 condition will be discussed below in connection with a selected line fetch digits condition.

In the executive routine of FIG. 5A, the detection at 104 of a line number key 15A–15E being actuated will be discussed below as the EXEC 080 routine of FIG. 5B. If at 105 it is determined that the hold key 15F is down the system moves to the hold key EXEC 010 routine and queries whether or not the line selected is zero at 161. If yes, and line zero is selected we are in the wrong place and the program moves back into the executive routine at 103. Although line zero is not an actual key in the system its detection indicates that in program should go back and look again in the executive routine because something erroneous has been detected. Essentially, this portion of the system function as a debouncer for the keys. The system routinely checks the data by putting in a timing and debounce routine to sense that the operator may have actuated two keys at the same time or some spurious signals indicative of multiple key depression. The routine EXEC 010 for this type of error.

If, however, at 161 the line selected is not zero, the system moves to 162 where the routine sets a hold flag in the line on hold flag memory 59 for the current line number which has been selected. Thereafter the system continues to move back into the executive routine at 103 looking for the actuation line number keys, the release key, or display characters.

If, in the executive routine of FIG. 5A it is determined at 106 that a release is key down, the system moves to the release key routine of EXEC 020 where the program again asks whether or not line zero was selected at 163. If such answer is yes then again an error has occurred and the system returns to the executive routine to continue evaluating the status of the system. If however, line zero was not selected at 163 the system moves on to 164 where the system sets the hold flag in the line on hold flag memory 59 to off for the current line number. Thereafter the system returns to the executive routine of FIG. 5A at 103 and continues to process the data.

Line Number Key Routine

As the keypad executive monitor routine of FIG. 5A continues to loop, a yes answer to the query at step 104 as to whether a line number key is down or not results in the program moving to the line number key routine of EXEC 080 FIG. 5B. There, the program evaluates data from the keyboard buffers 53 and 54 at 131 and determines whether or not line 1 has been selected and, if not, whether or not line 2 has been selected at 132. Similarly, the selection of line 3 is evaluated at 133, the selection of line 4 at 134, and whether or not line 5 has been selected at 135 in a 5 line example. If the routine determines at 131 that line 1 has been selected then the line number memory 57 is set to a value of 01 at 141 and the system moves to the test for hold routine EXEC 1000. Alternatively, if others ones of the line selection queries were answered in the affirmative the line number memory value 57 is set by the CPU 55 to the appropriate line number value for line 2 at 142, line 3 at 143, line 4 at 144 and line 5 at 145.

After the setting of the line number memory value, the program moves to the EXEC 1000 routine where at 136 the program delays the display and test for hold. When a line number key is actuated the character display telephone instrument 12 must send that information back to the PBX switch itself where calls are placed on hold and request that the switch connect the call it is holding on line 1 back to the telephone instrument. It takes a certain amount of time for the PBX switch to process the request and resend the call identifying data to the display telephone instrument 12. The time required is some part of a second and the character digits actually walk onto the display 17 of the display phone 12. The digits of call identifying data are sent in a serial fashion so that it is necessary to delay the system for a short period of time requiring the read display delay subroutine of FIG. 5B.

In the DELAY 0 routine the delay time is set at 137. The routine 137 continually sets a time and then asks in 138 whether or not the delay is done or not yet. If no, it returns to continually reset the time in a loop until the delay period has elapsed and is detected at 138. The routine then asks at 139 whether or not the current line is on hold. If no, the program moves to the fetch digits from display routine DIG 015. If, however, the current line number was evaluated at 139 to be on hold, the routine evaluates at 146 whether or not there is a dash in the display. If yes, the system evaluates at 147 whether the dash is in the digits 2-13-14 and, if so, the number is identified as an old number which calls out the old number subroutine of DIG 100. In subroutine DIG 100 the program finds at 148 the start of the current line number data in the buffer to recall the old line number and format an RS232 output signal and transmit that output at 149 to the PC. Thereafter the subroutine returns. If the dashes were not in the prescribed location, as evaluated in 147, the program goes to the fetch digits from display for a new number routine DIG 015.

After the delay display and test for hold step of 136 is satisfied, the program returns to set the hold bit off for the current line number at 140 and returns to the executive routine of FIG. 5A.

Compare Routine

Referring now to FIG. 5C if there were no dashes in the display as evaluated at 146, but the current line had been on hold as evaluated at 139, the system exits to the compare subroutine COMP ØØ of FIG. 5C. There, the routine finds the current line number data in the character memory (161-165) at 151 and inputs a digit number from the storage into the comparator at 152. The system asks at 153 if it is the correct number and it steps one by one through the 16 digits until the correct number is found. At 154 the program inputs the seven segment character value from the corresponding number from the display into the comparator and the values are compared digit by digit at 155 to the stored values. If the values are not equal at any point, the system recognizes that a new number is appearing on that line rather than the old number which had been previously stored when the line was placed on hold and exits to the fetch new digits from display for a new number routine DIG 015 of FIG. 5B. If, however, at 155 the display digit values are identical when compared to the stored digit values then the program asks if this is the last digit at 156. If not, the system decrements the digit in the stored value at 157 and returns to input a new digit number at 152. It thus continues to compare each character value digit by digit from the stored data for the particular line being evaluated to the current data then on the display to determine whether or not, after return from hold, the numbers are the same or not. If it is determined at 156 that this is the last digit and there has been a comparison on a digit by digit basis then the system determines that it is a same old number on the display and goes to transmit characters to the old number routine DIG 100 of FIG. 5B.

Fetch Digits from Display

Referring back to FIG. 5B, the routine for fetch digits from display for a new number, DIG 015, is used by the program to obtain character information from the display buffers in several circumstances, including where an initial call is forced to line 1 at 117 (FIG. 5A), after display delay when line not on hold (FIG. 5B) and after hold when stored nnd display information does not compare (FIG. 5C). In this routine (DIG 015), the program at 118 just finds the stored current line number data by locating the start of the current line number data storage areas in the buffer. Once it is located at 119 the program scans the display to retrieve the data that is being shown in the display and stores it in the buffer. The location of the data is stored in the line buffer location memory 58. Scanning is done through the CPU in buffers 51 and 52. Storage takes place via the bus structure 56 into the corresponding character memories 61-65 for each of the lines 1 through 5. Next, at 121 the system finds the start of the current line number data in the buffer to locate where it is stored and enters the transmit routine at 122. In this routine the line and call information is formatted in register 67 and output through the RS232 interface 19 via the opto-isolator 69 and lines 71 and 72. At the end of the fetch digits from display for new numbers routine DIG 015 of FIG. 5B the program returns to the execution routine of FIG. 5A.

Software Routine Summary

Referring now to FIG. 6, there is shown a summary software block diagram for the operation of the interface portion of the system of the present invention. It can be seen at 201 how the system is first initialized and moves to evaluating whether or not a line key is actuated at 202. If not, the system evaluates whether or not a hold key is actuated at 203, whether a release key is actuated at 204, or whether or not the display is full at 205. If none of these evaluations are positive the system continues to cycle through the keyboard and display monitor executive routine until one of the conditions monitored is detected. If it is determined at 205 that the display is full, the program of the system asks at 206 whether or not the current line is line 1. If the current line is line 1 and no line key has been actuated it means that the system is on line 1 as a result of a default routine for the first call coming in. Thus, the program moves to obtain new data from the display at 207, format the data at 208 and transmit the data 209 to the RS232 interface to the PC.

If, however, it is determined at 202 that a line key is actuated then at 211 it is evaluated whether or not a hold flag is set for that particular line. If not, the system again takes the new data at 207, formats the data at 208, and transmits the data at 209 to RS232 interface. If, however, the current line hold flag had been set for that line at 211, the interface goes to its own memory to obtain the old data at 212 (compares it to current data to make sure it is identical), formats the data at 208, and transmits the data at 209 to the RS232 interface. Thus, it can be seen how the system relies upon the setting of line on hold flags for certain line numbers along with the indication of the current line number to evaluate whether to obtain new data to format and transmit to the PC or whether to obtain the old data from its own memory and transmit to the PC.

In the event the system moves to 203 and finds that the hold key is actuated then it simply sets the hold flag on for the current line at 213 and moves on through the executive routine. If, the release key is found to be actuated at 204, the system sets the hold flag off for the current line at 214 and continues to move through the executive loop.

It can be seen from the above discussion of the functional elements of both the interface circuitry as well as the overall answering and messaging system of the present invention and the flow diagram of the operation and interrelationship of the elements thereof, that the system of the present invention functions to take the indications produced by the display and keyboard of a display type telephone in a character display type PBX system and greatly facilitate the management and usage of that information. The system and method enables an answering operator to quickly formulate a custom answer to each call on a plurality of individual lines and to take messages therefor on a conventional PC and thereby associate the message with the information stored in the memory of the PC. The data received by the interface from the character display phone system is both managed as well as formatted and transmitted to the PC for rapid and accurate handling and storage of the information in the memory of the PC in a readily retrievable and well organized manner.

Thus, the system of the present invention enables the use of a single station of a character display phone type PBX to be used as a messaging center for a large number of lines without requiring the dedication of individual trunks to individual lines to be answered. In addition, the system enables the answering operator to custom answer many more lines than could be handled utilizing the character display phone itself.

While the particular embodiments of the invention have been described above, changes and modifications may be made therein and still remain within the scope and the spirit of the invention. It is intended that the appended claims cover all such changes and modifications.

It is thus believed that the operation and construction of the present invention will be apparent from the foregoing description. While the method apparatus and system shown and described has been characterized as being preferred it would be obvious that various changes and modifications may be made therein without departing from the spirit and scope of the invention as defined in the following claims.

What is claimed is:

1. A system for providing enhanced telephone answering and information handling comprising:
    a PBX telephone system of the type including a plurality of incoming trunk lines and a plurality of PBX stations, each of said stations including a telephone instrument having an optical character display therein and means for transmitting call information signals indicative of a plurality of items of data from the switches of said PBX system to said character display telephone to generate a character display indicative of information about the call being sent to the telephone by the equipment;
    at least one character display phone telephone instrument connected as a station of said PBX said instrument including keys for selecting one of a plurality of lines for connection to said instrument;
    first means connected to said telephone instrument for receiving signals representative of the call information displayed by the character display on said instrument;
    second means connected to said telephone instrument for receiving signals produced by actuation of each key of said telephone instrument;
    control means connected to said first and second signal receiving means for storing data representative of said signals and producing a serial data output stream indicative of a line number to which said instrument is connected and the call information associated with the call on that line;
    a computer having an input port connected to receive the output data stream from said control means for storing the information of said data in a memory, said computer having means for storing in memory identification information associated with each item of data contained within said call information and means responsive to receipt of said serial data stream for recalling from said memory said identification and displaying said information for an operation answering said telephone instrument.

2. A system as set forth in claim 1 wherein said control means includes:
    means for storing in memory, character data indicative of call information associated with individual ones of the lines accessible through said station;
    means for storing in memory the number of the line to which said instrument is connected;
    means for storing in memory an indication of a hold condition for any one individual line to which said memory is accessible; and
    means for assembling data from both the line number memory and the character memory in a serial format for output to the input port of said computer.

3. A system as set forth in claim 2 wherein said means for formatting said data is connected to the input port of said computer by means of an opto-isolator to electrically isolate the interconnection of the telephone equipment from the computer equipment.

4. A system as set forth in claim 3 wherein power for output photo transistor of said opto-isolator is taken from the computer equipment.

5. A system as set forth in claim 4 wherein both positive and negative power are taken from the computer equipment.

6. An interface for a messaging station comprising a character display telephone connected as a station of a PBX system capable of transmitting to and displaying at said telephone optical characters indicative of, for each call, the calling party and the called party, said telephone being capable of key accessing a plurality of different lines within said PBX, placing each of said lines on hold by actuating a hold key, and releasing said lines from hold by actuating a release key, said circuit comprising:
    a central processing unit;
    a plurality of input buffers for connection to display data signal connections within said telephone to couple the character information contained in the display to said CPU;
    a plurality of input buffers connected to the keys of said telephone to couple to said CPU data signals indicative of actuation of any one of a plurality of line keys, the hold key or the release key of said telephone;

a plurality of character memory locations, one location being associated with the storage of calling party and called party character information for each of the lines accessible by said telephone;

a line number memory location for storage of data indicative of the line number currently connected to said telephone;

a line on hold flag memory, having a plurality of storage locations, one location for each of the lines to which said telephone is connectable, for storing an indication as to whether or not the line is on hold or not on hold;

means responsive to the detection of data from the display of said telephone and to data from the buffers connected to the keys of said telephone for storing said display data in the character memory location associated with line to which said telephone is connected and for assembling the data in a serial format representing line number, calling party and called party;

means for transmitting said serially formatted data from said interface circuit for communication with a computer or terminal device.

7. A circuit as set forth in claim 6 wherein said means responsive to said character and keyboard buffer information is also responsive to hold flag being set in said line on hold flag memory for comparing the data stored the character memory associated with a line with the current character data coming from said display buffers;

means responsive to a direct comparison between said respective compared data signals for recalling the stored character data from memory, assembling said data in a serial format and transmitting it;

means responsive to the lack of comparison between said data for substituting in said line character memory said new data, formatting said new data in serial format and transmitting it to an RS232 interface.

8. A system as set forth in claim 7 wherein said means transmitting serial data includes an opto-isolator.

9. A method for facilitating the handling of call information at a messaging station comprising a multi-line display phone connected to a character display phone PBX capable of transmitting call identifying information to said station including calling party, and called party, said method comprising:

extracting character information indicative of the characters in the display of said display phone;

extracting keyboard information from said display phone indicative of the actuation of any one of a plurality of the line keys, hold key or release key;

storing data indicative of the character information in said display in a memory;

storing the line number to which the phone is connected in a memory;

assembling the stored character data and line number data in serial format;

transmitting said assembled data in an RS232 format output for communication with a computer or terminal device to enable said computer to recall from its memory data indicative of said call information and displaying for an answering operator of said display phone indicative of each call it comes into said phone and enabling custom answering of a plurality of separate lines.

10. A method for facilitating the handling of call information at a messaging station as set forth in claim 9 wherein said transmitting step includes providing an opto-isolator circuit between data assembly equipment and said terminal device.

11. A method for facilitating the handling of call information at a messaging station as set forth in claim 10 which also includes the step of obtaining electrical power for operation of circuitry within said opto-isolator circuitry from said terminal device.

* * * * *